United States Patent [19]
Tanaka et al.

[11] Patent Number: 6,018,551
[45] Date of Patent: Jan. 25, 2000

[54] METHOD AND APPARATUS FOR REPRODUCING CARRIER

[75] Inventors: Koichiro Tanaka, Takarazuka; Hiroshi Oue, Neyagawa; Shinichiro Ohmi, Toyono, all of Japan

[73] Assignee: Matsushita Electric Industrial Co., Ltd., Osaka-fu, Japan

[21] Appl. No.: 08/904,265

[22] Filed: Jul. 31, 1997

[30] Foreign Application Priority Data

Aug. 1, 1996 [JP] Japan .................................. 8-203555

[51] Int. Cl.[7] .............................................. H04L 27/227
[52] U.S. Cl. ........................ 375/326; 375/339; 329/306; 329/346
[58] Field of Search .................................. 375/261, 326, 375/327, 339; 329/302, 306, 308, 323, 325, 346

[56] References Cited

U.S. PATENT DOCUMENTS

| | | | |
|---|---|---|---|
| 5,524,026 | 6/1996 | Murata ..................................... | 375/329 |
| 5,754,591 | 5/1998 | Samueli et al. ......................... | 375/235 |
| 5,838,736 | 11/1998 | Thomas et al. ......................... | 375/329 |
| 5,872,812 | 2/1999 | Saito et al. .............................. | 375/261 |

FOREIGN PATENT DOCUMENTS

2-19666  5/1990  Japan .

Primary Examiner—Amanda T. Le
Attorney, Agent, or Firm—Wenderoth, Lind & Ponack, L.L.P.

[57] ABSTRACT

A complex multiplier 5 complex-multiplies base band signals x and y obtained from a receive signal by local oscillation signals c and s, to output complex detection signals p and q. A phase difference detecting portion 7 outputs the amount of the detected phase difference corresponding to the phase difference between the phase of the receive signal and the phase of the local oscillation signals. A loop filter 8 emphasizes its DC component. A local oscillation portion 6 outputs local oscillation signals having a frequency corresponding to the amount of the detected phase difference. A region judging portion 9 judges which of regions on a complex plane is one to which the base band signals belong, and outputs a region signal. A most frequent region judging portion 10 judges which of the regions is one in which the base band signals are concentrated most frequently upon input of the region signal a predetermined number of times. An initial phase generator 11 generates an initial phase corresponding to a most frequent region. The local oscillation portion 6 sets the initial phase as an initial value of the phase of the local oscillation signals. It is first judged which of the regions previously obtained by division on the complex plane is one in which the complex base band signals are concentrated most frequently, and the initial value of the phase of the local oscillation signals is set on the basis of the results of the judgment, so that a carrier can be reproduced in simple construction while preventing a hang-up phenomenon.

6 Claims, 10 Drawing Sheets

METHOD AND APPARATUS FOR REPRODUCING CARRIER

BACKGROUND OF THE INVENTION

1. Field of the Invention

The present invention relates to a method and an apparatus for reproducing a carrier, and more particularly, to a method and an apparatus for reproducing, from a receive signal whose carrier is phase-modulated, the carrier.

2. Description of the Background Art

In receiving a signal which is phase-modulated as in phase shift keying (PSK) and demodulating the phase-modulated signal, a carrier must be produced from the phase-modulated signal. The reproduced carrier is used for examining the phase of a receive signal.

Figure 14:
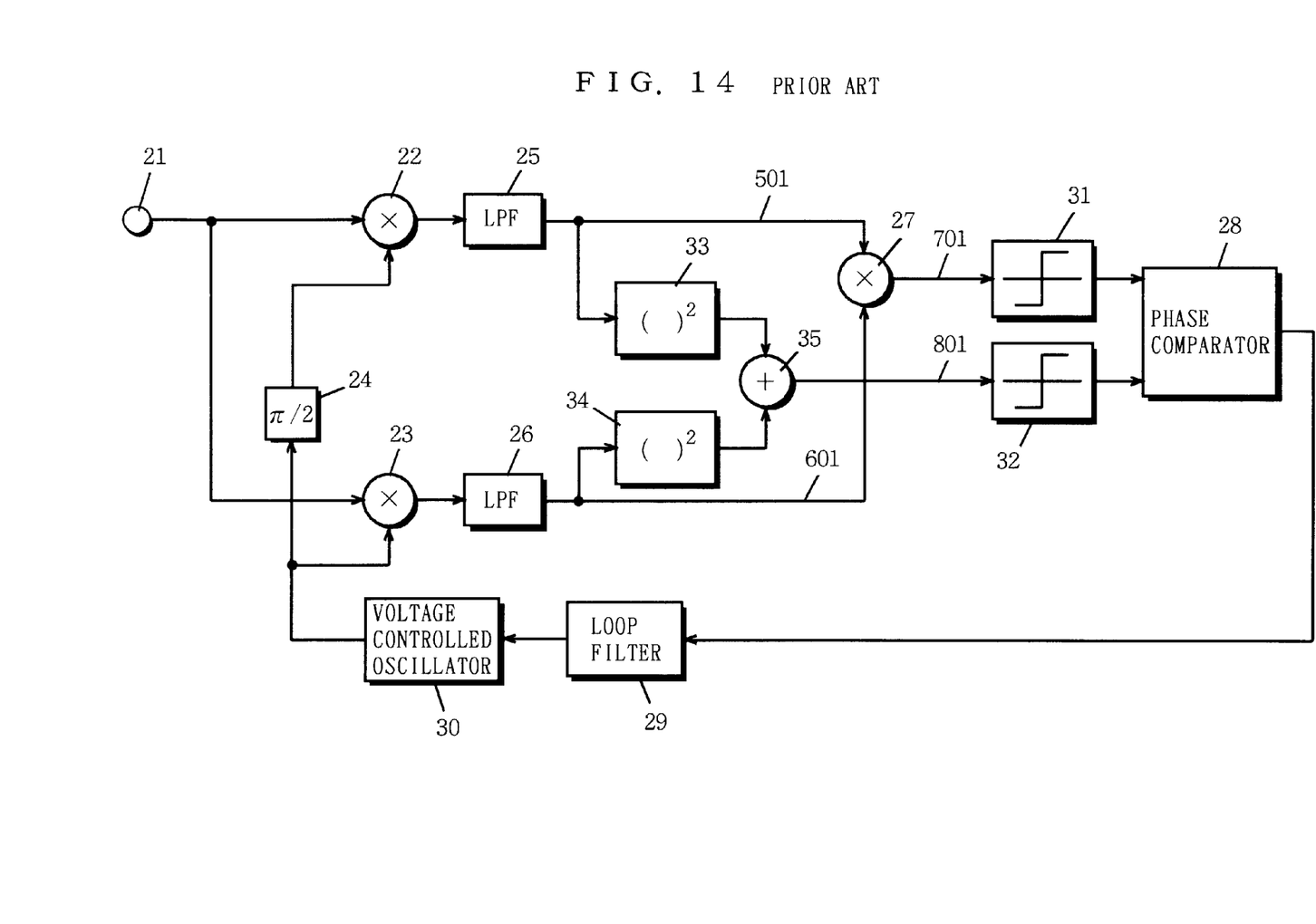
FIG. 14 is a block diagram showing the construction of a conventional carrier reproducing device.

As a conventional carrier reproducing device, one described in Japanese Patent Publication No. 19666/1990, for example, has been known. FIG. 14 is a block diagram showing the construction of the conventional carrier reproducing device. In FIG. 14, the conventional carrier reproducing device comprises a receive signal input terminal 21, multipliers 22, 23 and 27, a π/2 radian phase shifter 24, low-pass filters 25 and 26, a phase comparator 28, a loop filter 29, a voltage controlled oscillator 30, level judging units 31 and 32, square units 33 and 34, and an adder 35. FIG. 14 illustrates the construction in the case of a binary PSK system.

Description is now made of operations performed by the carrier reproducing device shown in FIG. 14. A receive signal which is phase-modulated is inputted from the receive signal input terminal 21. The receive signal is fed to the multipliers 22 and 23. The multiplier 22 multiplies the receive signal by an output signal of the voltage controlled oscillator 30 whose phase is shifted 90° by the π/2 radian phase shifter 24. The multiplier 23 multiples the receive signal by the output signal of the voltage controlled oscillator 30. The receive signal is converted into complex base band signals by the multipliers 22 and 23.

An output of the multiplier 22 is then fed to the multiplier 27 as a signal 501 representing a sine component of the receive signal after its extra noise component is removed by the low-pass filter 25. An output of the multiplier 23 is fed to the multiplier 27 as a signal 601 representing a cosine component of the receive signal after its extra noise component is removed by the low-pass filter 26. The multiplier 27 multiplies the signals 501 and 601 together, to output a signal 701 having a sine component of twice the difference between the phase of the receive signal and the phase of the voltage controlled oscillator 30.

Furthermore, the output of the multiplier 22 is squared by the square unit 33 after the extra noise component is removed by the low-pass filter 25, and the squared output is fed to the adder 35. Further, the output of the multiplier 23 is squared by the square unit 34 after the extra noise component is removed by the low-pass filter 26, and the squared output is fed to the adder 35. The adder 35 adds the output signals of the square units 33 and 34 and synthesizes the result, to output a signal 801 having a cosine component of twice the difference between the phase of the receive signal and the phase of the voltage controlled oscillator 30. The signals 701 and 801 are fed to the phase comparator 28 after the respective levels are judged by the level judging units 31 and 32, so that an error between the phase of the receive signal and the phase of the voltage controlled oscillator 30 on a complex plane is detected. An output of phase comparator 28 controls the oscillation phase of the voltage controlled oscillator 30 via the loop filter 29.

In the above-mentioned construction, an output signal of the voltage controlled oscillator 30 at the time point where the error between the phase of the receive signal and the phase of the voltage controlled oscillator 30 reaches zero becomes a reproduced carrier. That is, the phase of the output signal of the voltage controlled oscillator 30 at this time point coincides with the phase of the receive signal. The reproduced carrier is fed to a demodulating circuit (not shown), and is used for examining the phase of the receive signal (0° or 180° in the case of the binary PSK system).

An example corresponding to a quadrature PSK system by further adding a multiplier, a square unit and an adder to the above-mentioned construction is also described in the above-mentioned gazette.

As described in the foregoing, in the conventional carrier reproducing device, both a sine component and a cosine component are obtained with respect to the phase difference. This is for preventing a so-called hang-up phenomenon. The hang-up phenomenon occurs when a reproduced base band signal is just shifted +90° or −90° from its ideal phase position. In this case, it cannot be judged whether the base band signal should be rotated in a positive direction or a negative direction. In the conventional carrier reproducing device, both the sine component and the cosine component of the phase difference are obtained, and hysteresis characteristics are introduced when the direction of rotation is determined, so that the direction of rotation is determinable when the base band signal is shifted +90° or −90° from the ideal phase position.

As described in the foregoing, in the conventional carrier reproducing device, a lot of multipliers and square units must be provided in order to prevent the hang-up phenomenon, so that the circuit scale thereof is increased. Particularly when an input signal takes a digitized numerical value, and the carrier reproducing device is composed of a digital circuit, the scales of the multiplier and the square unit are large, so that the scale of a portion where the phase difference is detected is significantly increased.

SUMMARY OF THE INVENTION

Therefore, an object of the present invention is to provide a method and an apparatus for reproducing a carrier in which a hung-up phenomenon can be prevented on a small circuit scale.

In order to attain the above-mentioned object, the present invention is characterized as follows.

A first aspect of the present invention is directed to a device for reproducing from an input signal whose carrier is phase-modulated the carrier, comprising:

a converting portion for converting the input signal into a complex base band signal, a complex multiplier for complex-multiplying the complex base band signal by a local oscillation signal, to rotate the phase of the complex base band signal, a phase difference detecting portion for detecting the phase difference between the input signal and the local oscillation signal upon input of an output signal of the complex multiplier, a local oscillation portion for outputting the local oscillation signal whose frequency is controlled depending on the phase difference detected by the phase difference detecting portion, a region judging portion for judging which of regions previously obtained by division on a complex plane is one to which the complex base band signal belongs, a most frequent region judging portion for judging which of the regions on the complex plane is one in which the complex base band signal is concentrated most frequently upon input of an output of the region judging portion, and an initial phase setting portion for setting the initial value of the phase of the local oscillation signal on the basis of an output of the most frequent region judging portion.

As described in the foregoing, in the first aspect, it is first judged which of the regions previously obtained by division on the complex plane is one in which the complex base band signal is concentrated most frequently, and the initial value of the phase of the local oscillation signal is set on the basis of the results of the judgment, to prevent a hang-up phenomenon. Therefore, a cosine component of the phase difference need not be obtained, so that the carrier can be reproduced by a simple comparator or logic element.

A second aspect of the present invention is characterized in that in the first aspect, the input signal is inputted in a burst shape, and by further comprising;

a storage portion for storing the complex base band signal, and a reading portion for reading arbitrary parts of data in the storage portion in an arbitrary order and supplying the parts to the complex multiplier and the region judging portion.

As described in the foregoing, in the second aspect, the carrier can be reproduced in correspondence to the input signal in a burst shape.

A third aspect of the present invention is characterized in that in the second aspect, the reading portion reads the parts of the base band signal stored in the storage portion one over the other.

As described in the foregoing, according to the third aspect, after completion of an initial phase setting and correction of the phase of the local oscillation signal, the base band signal held in the storage portion can be demodulated over the whole of one burst. Consequently, a training signal for reproducing a carrier (a modulation signal sent only for phase matching of the carrier) need not be included in the burst, so that it is possible to improve the transmission efficiency.

A fourth aspect of the present invention is directed to a method of reproducing, from an input signal whose carrier is phase-modulated, the carrier, comprising:

a) converting the input signal into a complex base band signal, b) complex-multiplying the complex base band signal by a local oscillation signal, to rotate the phase of the complex base band signal, c) detecting the phase difference between the input signal and the local oscillation signal upon input of the result of the multiplication obtained in the b) complex-multiplying, d) controlling the frequency of the local oscillation signal depending on the phase difference detected in the detecting, e) judging which of regions previously obtained by division on a complex plane is one to which the complex base band signal belongs, f) judging which of the regions on the complex plane is one in which the complex base band signal is concentrated most frequently on the basis of the results of the judgment in the e) judging, and g) setting the initial value of the phase of the local oscillation signal on the basis of the results of the judgment in the f) judging.

As described in the foregoing, in the fourth aspect, it is first judged which of the regions previously obtained by division on the complex plane is one in which the complex base band signal is concentrated most frequently, and the initial value of the phase of the local oscillation signal is set on the basis of the results of the judgment, to prevent a hang-up phenomenon. Therefore, a cosine component of the phase difference need not be found, so that the carrier can be reproduced by simple processing.

A fifth aspect of the present invention is characterized in that in the fourth aspect, the input signal is inputted in a burst shape, and by further comprising h) storing the complex base band signal obtained in the a) converting, and i) reading arbitrary parts of the complex base band signal stored in the h) storing in an arbitrary order and supplying the parts for processing in the b) complex-multipl and fifth e) judging steps.

As described in the foregoing, in the fifth aspect, the carrier can be reproduced in correspondence to the input signal in a burst shape.

A sixth aspect of the present invention is characterized in that in the fifth aspect, the i) reading is of reading the parts of the complex base band signal stored in the h) storing one over the other.

As described in the foregoing, according to the sixth aspect, the base band signal stored and held can be demodulated over the whole of one burst after completion of initial phase setting and correction of the phase of the local oscillation signal. Consequently, a training signal for reproducing a carrier (a modulation signal sent only for phase matching of the carrier) need not be included in the burst, so that the transmission efficiency can be improved.

BRIEF DESCRIPTION OF THE DRAWING

The foregoing and other objects, features, aspects and advantages of the present invention will become more apparent from the following detailed description of the present invention when taken in conjunction with the accompanying drawing, in which.

DESCRIPTION OF THE PREFERRED EMBODIMENTS

Embodiments of the present invention will be described in detail on the basis of accompanying drawings.

(First Embodiment)

Figure 1:
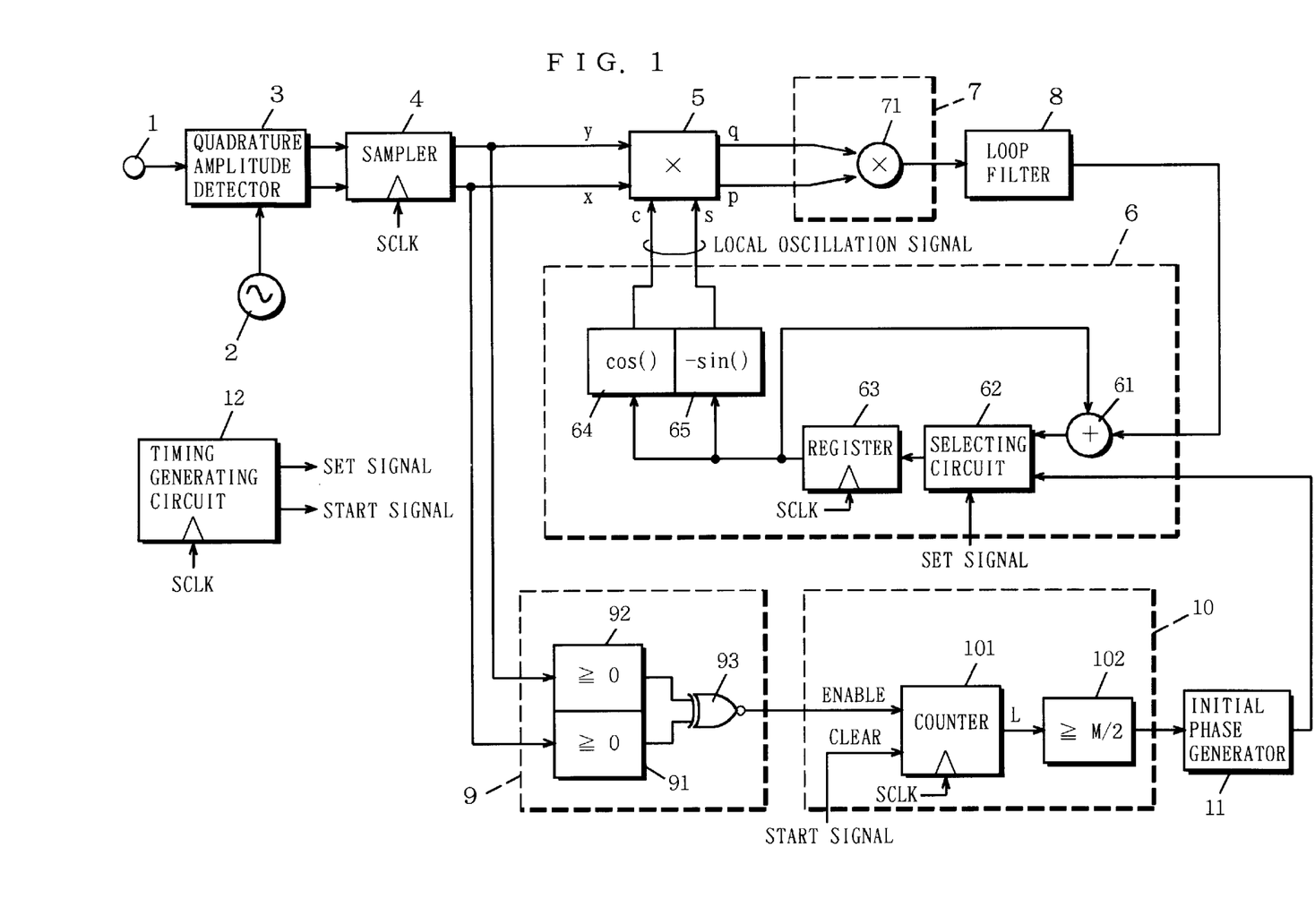
FIG. 1 is a block diagram showing the construction of a carrier reproducing device according to a first embodiment of the present invention.

FIG. 1 is a block diagram showing the construction of a carrier reproducing device according to a first embodiment of the present invention. The present embodiment is one for reproducing a carrier in a binary PSK system for performing carrier reproduction processing in a base band so as to be suitable for digitization of a circuit.

In FIG. 1, a carrier reproducing device in the present embodiment comprises a receive signal input terminal 1, a fixed frequency oscillator 2, a quadrature amplitude detector 3, a sampler 4, a complex multiplier 5, a local oscillation portion 6, a phase difference detecting portion 7, a loop filter 8, a region judging portion 9, a most frequent region judging portion 10, an initial phase generator 11, and a timing generating circuit 12.

The local oscillation portion 6 comprises an adder 61, a selecting circuit 62, a register 63, a cosine function generator 64, and a sine function generator 65. The phase difference detecting portion 7 comprises a multiplier 71. The region judging portion 9 comprises comparators 91 and 92, and a logic circuit 93. The most frequent region judging portion 10 comprises a counter 101 and a comparator 102. The initial phase generator 11 and the selecting circuit 62 constitute an initial phase setting portion in cooperation.

The quadrature amplitude detector 3 detects a receive signal inputted to the receive signal input terminal 1 on the basis of a signal from the fixed frequency oscillator 2 having an oscillation frequency equal to the frequency of the receive signal, to output complex base band signals. The sampler 4 samples the complex base band signals in synchronization with a symbol clock SCLK (that is, symbol timing of the receive signal), to output base band signals x and y. The complex multiplier 5 complex-multiplies the base band signals x and y by local oscillation signals c and s, to output complex detection signals p and q. The multiplier 71 serving as the phase difference detecting portion 7 multiplies the complex detection signals p and q together, to output a sine component of twice the phase difference between the phase of the receive signal and the phase of the local oscillation signals as the amount of the detected phase difference. The loop filter 8 emphases a DC component of the amount of the detected phase difference. The local oscillation portion 6 outputs the local oscillation signals c and s having a frequency corresponding to the amount of the detected phase difference outputted by the loop filter 8. The region judging portion 9 judges which of regions on a complex plane is one to which the base band signals x and y belong, to output a region signal. The most frequent region judging portion 10 inputs the region signal only a predetermined number of times M, and judges which of the regions is one to which the base band signals belong most frequently, to output a most frequent region signal. The initial phase generator 11 generates an initial phase corresponding to the most frequent region signal. The local oscillation portion 6 sets the initial phase in the phase of the local oscillation signals at the time point where the initial phase is generated. The timing generating circuit 12 outputs a set signal required by the local oscillation portion 6 and a start signal required by the most frequent region judging portion 10.

Operations performed by the region judging portion 9, the most frequent region judging portion 10, the initial phase generator 11, the timing generating circuit 12 and the local oscillation portion 6 will be described in detail.

The comparators 91 and 92 in the region judging portion 9 respectively output a logical level 1 when the base band signals x and y are not less than zero, while outputting a logical level 0 when they are less than zero. The logic circuit 93 outputs a logical level 1 when outputs of the comparators 91 and 92 are equal to each other, while outputting a logical level 0 when they are different from each other. That is, referring to FIG. 2, the logical level 1 is outputted in a case where the base band signals x and y belong to a hatched region (a region satisfying $x \geq 0$ and $y \geq 0$, or a region satisfying $x<0$ and $y<0$), while the logical level 0 is outputted in the other case.

The count value of the counter 101 in the most frequent region judging portion 10 reaches zero when the start signal (see FIG. 3) outputted by the timing generating circuit 12 becomes active, so that the counter 101 starts to count from the subsequent symbol clock. The counter 101 outputs, when finishing counting symbol clocks M times, the result of the counting L indicating how many times out of the predetermined M times the logical level 1 is outputted. The comparator 102 outputs a signal representing a hatched region shown in FIG. 2 if the result of the counting L is not less than M/2, while outputting a signal representing an unhatched region shown in FIG. 2 if it is less than M/2.

Figure 2:
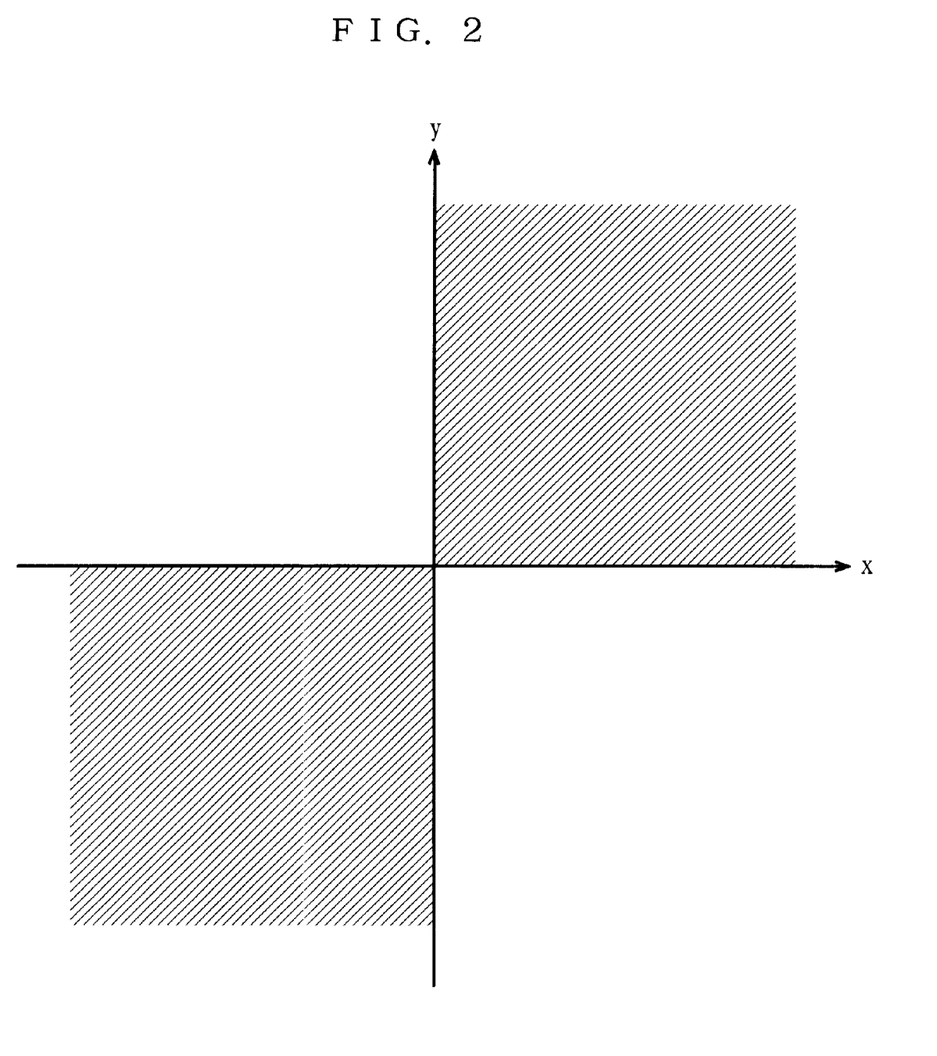
FIG. 2 is a diagram showing regions on a complex plane used in judging a most frequent region in the first embodiment.
Figure 3:
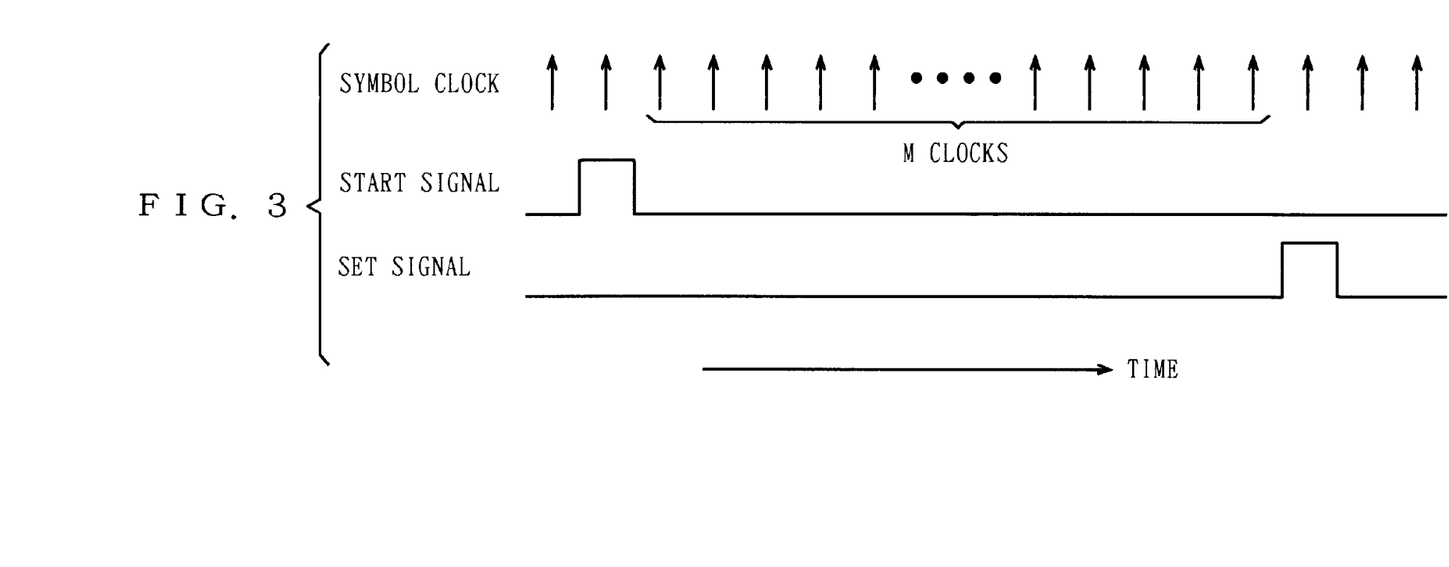
FIG. 3 is a timing chart showing an output of a timing generating circuit 12 shown in FIG. 1.

The initial phase generator 11 outputs an initial phase $\pi/4$ with respect to the signal representing a hatched region, while outputting an initial phase $-\pi/4$ with respect to the signal representing an unhatched region.

In the local oscillation portion 6, the selecting circuit 62 selects the initial phase at timing at which the set signal is outputted from the timing generating circuit 12, that is, timing at which the initial phase is outputted from the initial phase generator 11, and the register 63 acquires the initial phase. The selecting circuit 62 selects an output of the adder 61, that is, the sum of an output of the register 63 and an output of the loop filter 8 at timing other than the above-mentioned timing. Consequently, a value held by the register 63 is corrected depending on the amount of the detected phase difference outputted by the loop filter 8. Correspondingly, the phase of the local oscillation signals outputted by the local oscillation portion 6 is corrected. The cosine function generator 64 and the sine function generator 65 input the phase of the local oscillation signals, to output the local oscillation signals.

The reason why a hang-up phenomenon can be prevented by the foregoing construction will be described.

The region judging portion 9 and the most frequent region judging portion 10 judge which of the regions shown in FIG. 2 is one in which the base band signals x and y exist most frequently. When the base band signals x and y exist most frequently in the hatched region shown in FIG. 2, it can be judged that the phase is rotated by 0 to $\pi/2$ or $-\pi$ to $-\pi/2$, as compared with that of ideal base band signals x and y in the binary PSK system shown in FIG. 4. A true rotation angle may, in some cases, be beyond this range due to the effect of noise, but is not far beyond the range. At this time, when a phase $\pi/4$ is generated by the initial phase generator 11, and is set in the phase of the local oscillation portion 6, the set phase falls within $\pm\pi/4$, as viewed from the rotation angle (the phase in the binary PSK system is positioned for each $\pi$, so that the phase difference which is an integral multiple of $\pi$ is subtracted). In this case, there is no possibility that the set phase is in the vicinity of $\pm\pi/2$, as viewed from the rotation angle, so that it is possible to prevent the hang-up phenomenon.

Figure 4:
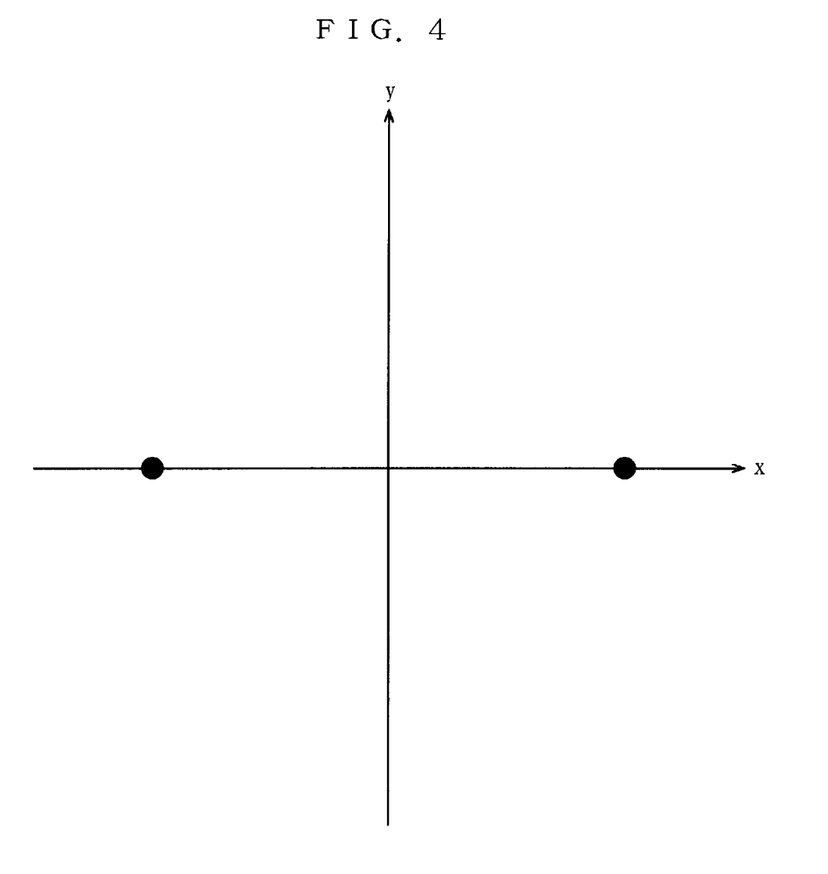
FIG. 4 is a diagram showing an ideal position of a binary PSK signal on a complex plane.

On the other hand, when the base band signals x and y exist most frequently in the unhatched region shown in FIG. 2, it can be judged that the phase is rotated by $-\pi/2$ to 0 or $\pi/2$ to $\pi$, as compared with that of ideal base band signals x and y in the binary PSK system shown in FIG. 4. A true rotation angle may, in some cases, be beyond this range due to the effect of noise, but is not far beyond the range. At this time, when a phase $-\pi/4$ is generated by the initial phase generator 11, and is set in the phase of the local oscillation portion 6, the set phase falls within $\pm\pi/4$, as viewed from the rotation angle (the phase in the binary PSK system is positioned for each $\pi$, so that the phase difference which is an integral multiple of $\pi$ is subtracted). In this case, there is no possibility that the set phase is in the vicinity of $\pm\pi/2$, as viewed from the rotation angle, so that it is possible to prevent the hang-up phenomenon.

In the above-mentioned construction, an output signal of the local oscillation signals at the time point where the error between the phase of the receive signal and the phase of the local oscillation signals reaches zero (that is, at the time point where the amount of the detected phase difference held by the register 63 reaches zero) becomes a reproduced carrier. That is, the phase of the local oscillation signals at this time point coincides with the phase of the receive signal. The reproduced carrier is fed to a demodulating circuit (not shown), and is used for examining the phase of the receive signal (0° or 180° in the case of the binary PSK system).

Although in the first embodiment, the quadrature amplitude detector 3 and the sampler 4 are used for obtaining the base band signals x and y, various constructions can be employed in addition thereto. For example, a waveform shaping filter can be inserted between the quadrature amplitude detector 3 and the sampler 4, or a decimation filter may be provided after the quadrature amplitude detector 3 to omit the sampler 4. Although the loop filter 8 is provided after the phase difference detecting portion 7, the loop filter 8 can be omitted in a case where a frequency error of the receive signal is small.

(Second Embodiment)

A carrier reproducing device corresponding to a quadrature PSK system can be obtained by slightly changing the structures of the phase difference detecting portion 7, the region judging portion 9 and the initial phase generator 11 shown in FIG. 1. The structures and the operations of the changed portions will be described. The structures and the operations of the other portions are the same as those in the first embodiment and hence, the description thereof is not repeated.

Figure 5:
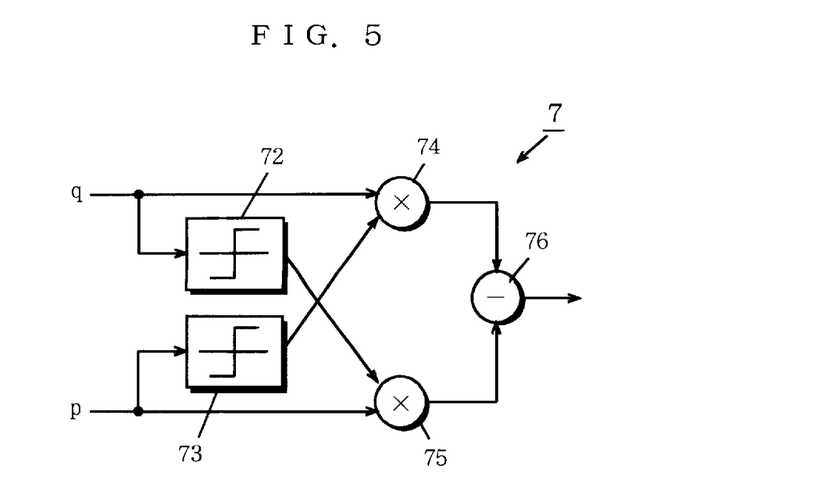
FIG. 5 is a block diagram showing the construction of a phase difference detecting portion in a carrier reproducing device in a second embodiment of the present invention.

In a second embodiment, the phase difference detecting portion 7 comprises level judging units 72 and 73, multipliers 74 and 75, and a subtracter 76, as shown in FIG. 5. This is construction known as a modified Costas loop, which outputs a sine component of the phase difference between the phase of a receive signal and the phase of local oscillation signals.

Figure 6:
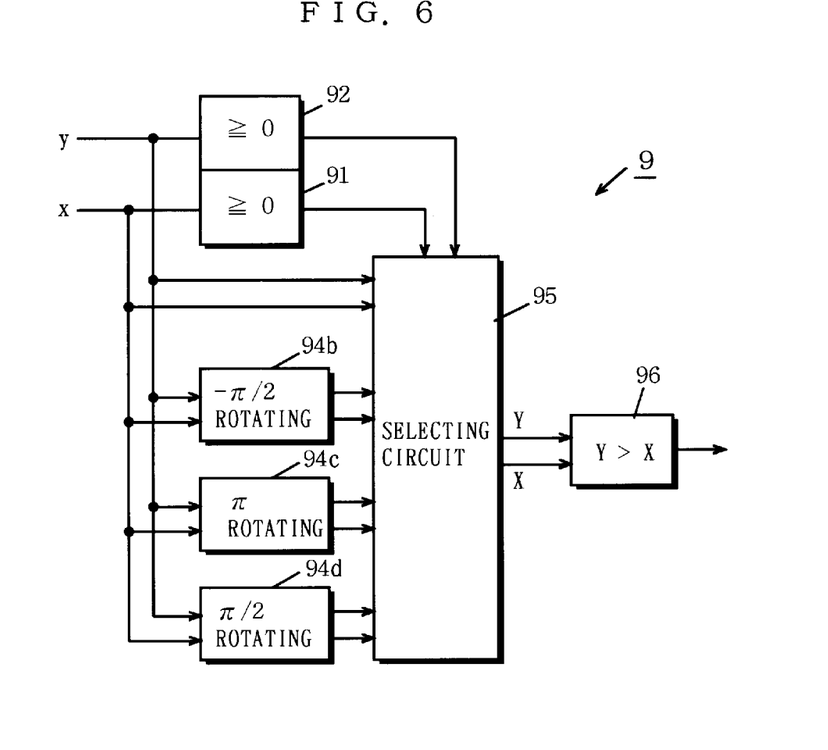
FIG. 6 is a block diagram showing the construction of a region judging portion in the carrier reproducing device in the second embodiment of the present invention.

In the second embodiment, the region judging portion 9 comprises comparators 91 and 92, a $-\pi/2$ rotating unit 94b, a $\pi$ rotating unit 94c, a $\pi/2$ rotating unit 94d, a selecting circuit 95, and a comparator 96, as shown in FIG. 6. The sets of logical levels which are respectively outputted by the comparators 91 and 92 are the following four:

(a) 1, 1
(b) 0, 1
(c) 0, 0
(d) 1, 0

(a), (b), (c), and (d) respectively indicate first, second, third and fourth quadrants, respectively. The selecting circuit 95 selects x and y themselves in the case (a), x and y rotated by $-\pi/2$ by the $-\pi/2$ rotating unit 94b in the case (b), x and y rotated $\pi$ by the $\pi$ rotating unit 94c in the case (c), and x and y rotated by $\pi/2$ by the $\pi/2$ rotating unit 94d in the case (d). That is, outputs X and Y of the selecting circuit 95 are collected in the first quadrant. The comparator 96 compares the outputs X and Y, to output a logical level 1 in the case of a hatched region shown in FIG. 7, while outputting a logical level 0 in the case of an unhatched region shown in FIG. 7.

Figure 7:
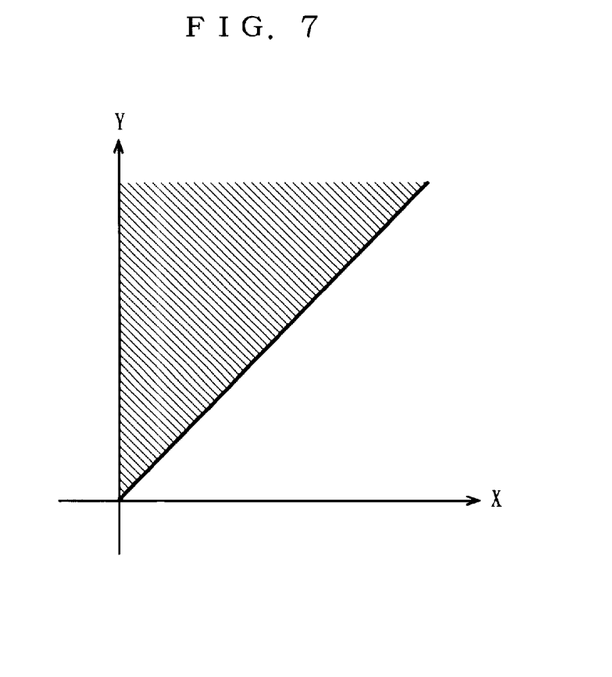
FIG. 7 is a diagram showing regions on a complex plane used in judging a most frequent region in the second embodiment.

Furthermore, in the second embodiment, the initial phase generator 11 outputs an initial phase $\pi/8$ when base band signals exist most frequently in the hatched region shown in FIG. 7, while outputting an initial phase $-\pi/8$ when the base band signals exist most frequently in the unhatched region.

Figure 8:
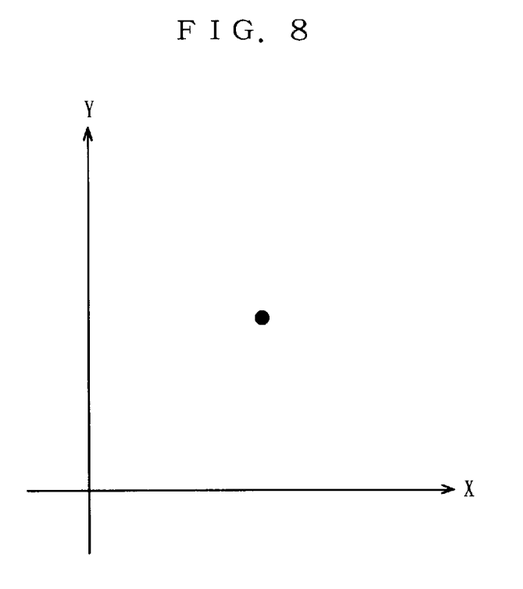
FIG. 8 is a diagram showing an ideal position of a quadrature PSK signal on a complex plane.

When the base band signals X and Y exist in the hatched region shown in FIG. 7, it can be judged that the phase is rotated by 0 to $\pi/4$, as compared with that of ideal base band signals X and Y in the quadrature PSK system shown in FIG. 8. A true rotation angle may, in some cases, be beyond this range due to the effect of noise, but is not far beyond the range. At this time, when a phase $\pi/8$ is generated by the initial phase generator 11, and is set in the phase of a local oscillation portion 6, the set phase falls within $\pm\pi/8$, as viewed from the rotation angle. In this case, there is no possibility that the set phase is in the vicinity of $\pm\pi/4$, as viewed from the rotation angle, so that it is possible to prevent a hang-up phenomenon.

On the other hand, when the base band signals X and Y exist in the unhatched region shown in FIG. 7, it can be judged that the phase is rotated by $-\pi/4$ to 0, as compared with that of ideal base band signals X and Y in the quadrature PSK system shown in FIG. 8. A true rotation angle may, in some cases, be beyond this range due to the effect of noise, but is not far beyond the range. At this time, when a phase $-\pi/8$ is generated by the initial phase generator 11, and is set in the phase of the local oscillation portion 6, the set phase falls within $\pm\pi/8$, as viewed from the rotation angle. In this case, there is no possibility that the set phase is in the vicinity of $\pm\pi/4$, as viewed from the rotation angle, so that it is possible to prevent the hang-up phenomenon.

(Third Embodiment)

Figure 9:
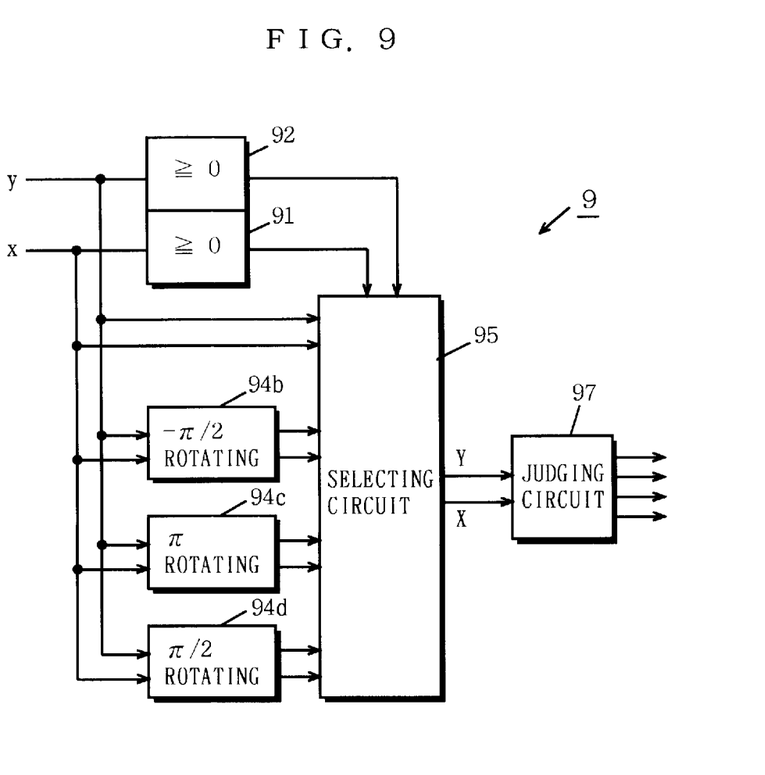
FIG. 9 is a block diagram showing the construction of a region judging portion in a carrier reproducing device in a third embodiment of the present invention.
Figure 10:
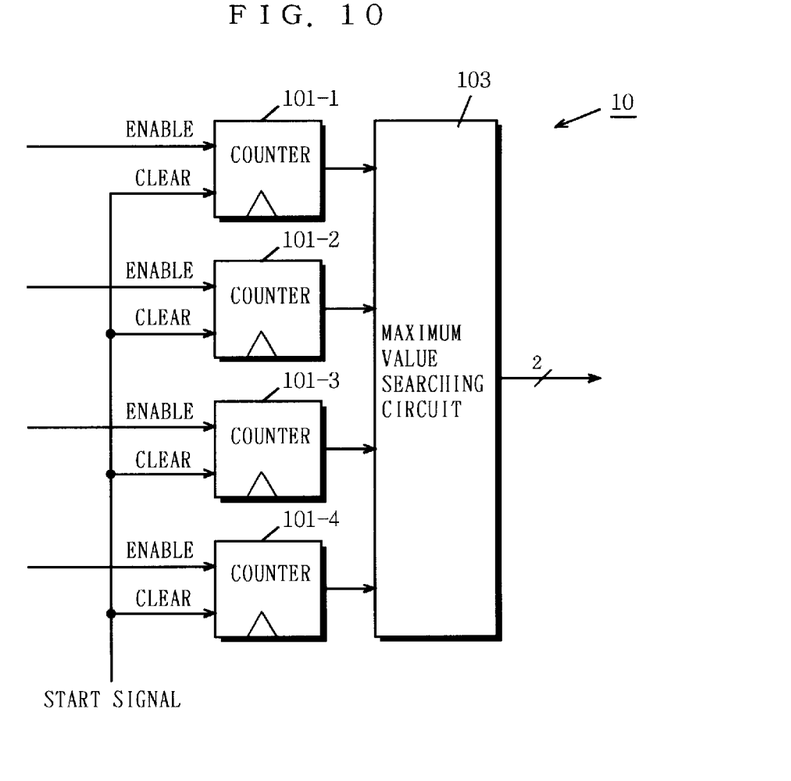
FIG. 10 is a block diagram showing the construction of a most frequent region judging portion in the carrier reproducing device in the third embodiment of the present invention.
Figure 11:
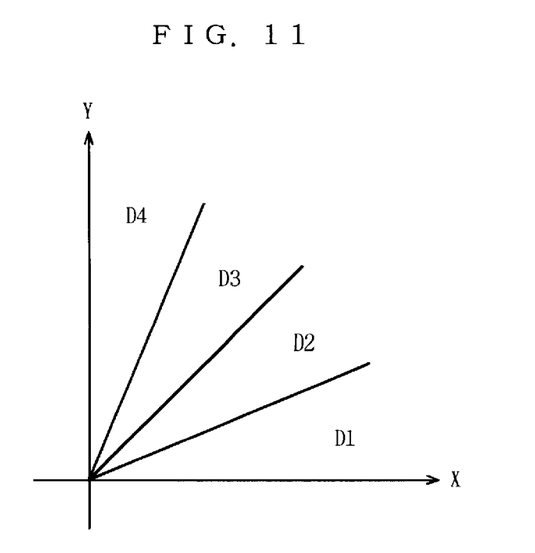
FIG. 11 is a diagram showing regions on a complex plane used in judging a most frequent region in the third embodiment.

A region judging portion 9 may be constructed as shown in FIG. 9 so that a judging circuit 97 judges base band signals X and Y, to output the results of the judgment which of two or more regions (four regions herein) as shown in FIG. 11 is one to which the base band signals X and Y belong. Only one of four outputs is a logical level 1. In this case, a most frequent region judging portion 10 is constructed as shown in FIG. 10, to count the four outputs by counters 101-1 to 101-4. A maximum value searching circuit 103 provides an output indicating which of the counters 101-1 to 101-4 has the largest value. There are four types of results, so that each of the results can be represented by a 2-bit output. An initial phase generator 11 respectively outputs initial phases $-3\pi/16$, $-\pi/16$, $\pi/16$, and $3\pi/16$ depending on regions D1, D2, D3, and D4 shown in FIG. 11. Consequently, the initial phase falls within a narrow range, $\pm\pi/16$, as viewed from the rotation angle, so that the correction of the phase of local oscillation signals after setting the initial phase is completed early.

(Fourth Embodiment)

Figure 12:
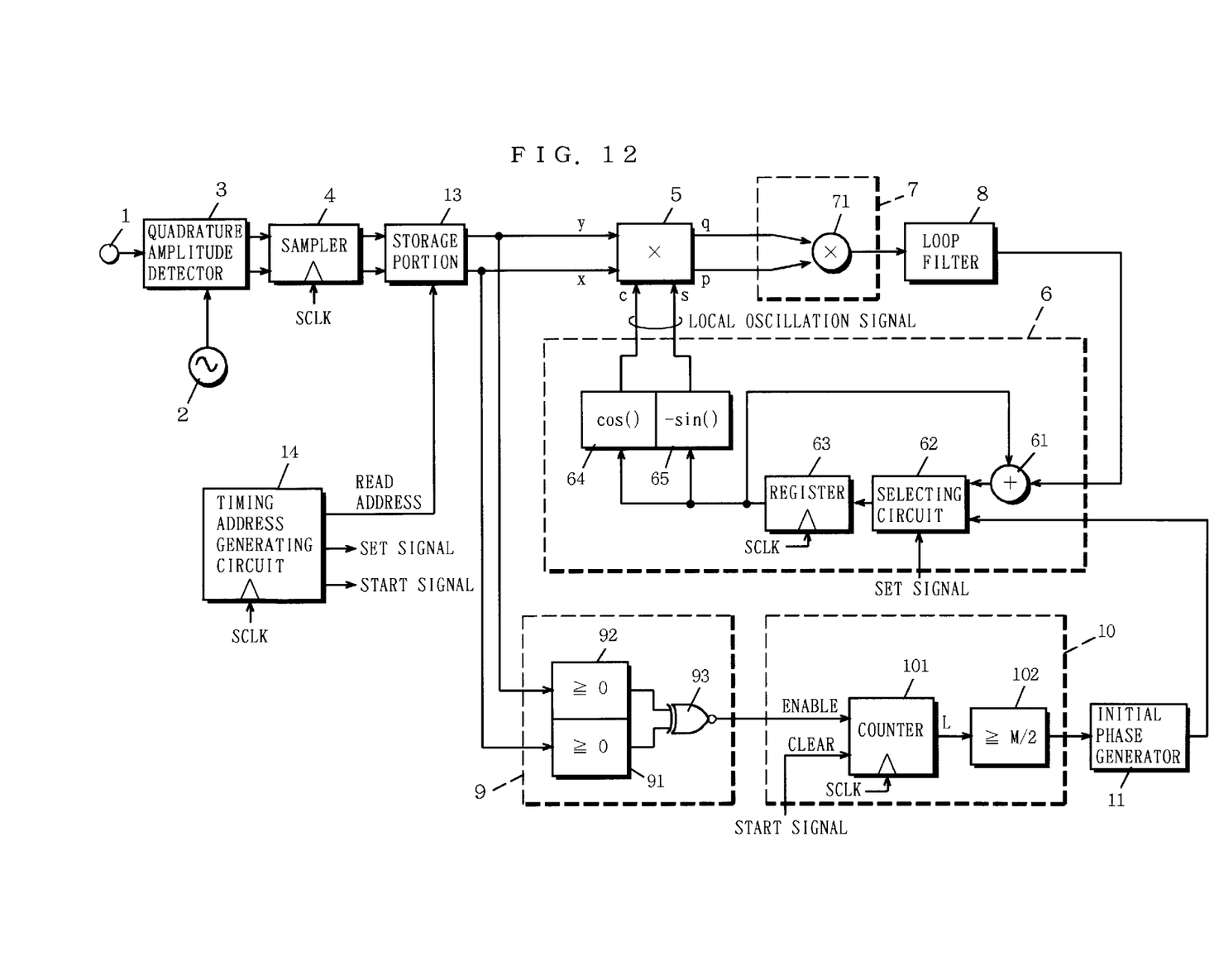
FIG. 12 is a block diagram showing the construction of a carrier reproducing device in a fourth embodiment of the present invention.

FIG. 12 is a block diagram showing the construction of a carrier reproducing device according to a fourth embodiment of the present invention. The present embodiment also corresponds to a burst-shaped receive signal (an intermittently inputted receive signal which is continued in an arbitrary period).

As shown in FIG. 12, the fourth embodiment differs from the above-mentioned first embodiment in construction in that a storage unit 13 is inserted after a sampler 4, and a timing address generating circuit 14 is further provided, to generate a set signal and a start signal as well as to generate addresses to be supplied to the storage unit 13. The structures of the other portions are the same as those in the first embodiment. Corresponding portions are assigned the same reference numerals and hence, the description thereof is not repeated. Operations performed by portions having different structures will be described.

Figure 13:
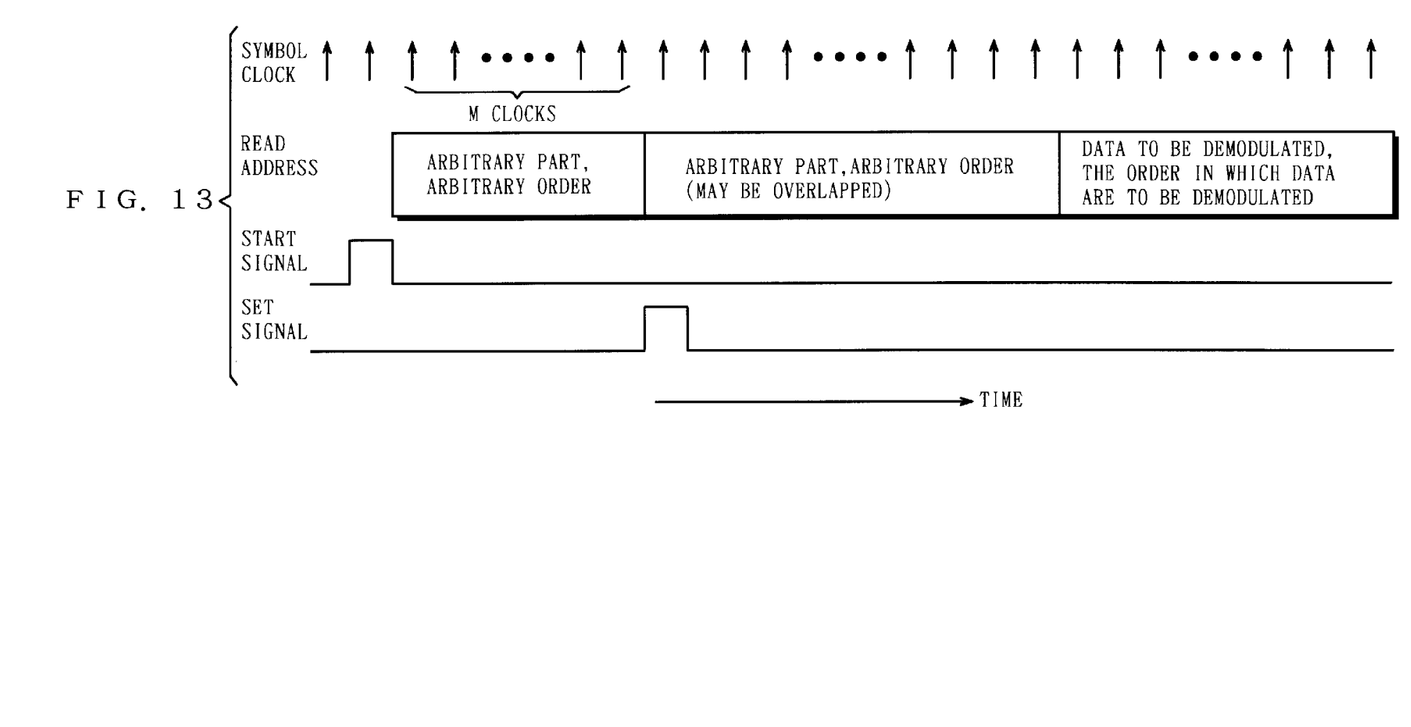
FIG. 13 is a timing chart showing an output of a timing address generating circuit shown in FIG. 12.

The storage unit 13 stores base band signals obtained by converting a receive signal. The timing address generating circuit 14 first outputs a start signal, and subsequently outputs read addresses in an arbitrary part of the storage unit 13 which correspond to M symbol clocks in an arbitrary order, as shown in FIG. 13. When the number of regions obtained by division is small, or little noise is included in the receive signal, the number of symbols to be read may be small. On the other hand, when the number of regions obtained by division is large, or much noise is included in the receive signal, the number of symbols to be read must be increased. The start signal and the read addresses may be outputted before the storage unit 13 has stored the whole of one burst. At the time point where M read addresses have been outputted, a region judging portion 9 and a most frequent region judging portion 10 judge a most frequent region, and an initial phase generator 11 outputs an initial phase.

The timing address generating circuit 14 then outputs a set signal, and subsequently outputs read addresses in an arbitrary part of the storage unit 13 in an arbitrary order, as shown in FIG. 13. The read addresses may be overlapped with each other, and the number of symbols to be generated may exceed one burst. That is, base band signals corresponding to one burst may be repeatedly read. In short, a sufficient number of symbols to be read is determined so that the correction of the phase of local oscillation signals is completed. Consequently, the phase of local oscillation signals outputted by a local oscillation portion 6 is corrected.

Finally, the timing address generating circuit 14 outputs read addresses about data to be demodulated in the storage unit 13 in the order in which the data are to be demodulated, as shown in FIG. 13.

The foregoing construction makes it possible to demodulate the base band signals held in the storage unit 13 over the whole of one burst after completion an initial phase setting and correction of the phase of the local oscillation signals. Consequently, a training signal for reproducing a carrier (a modulated signal sent only for phase matching of the carrier) need not be included in the burst, so that it is possible to improve the transmission efficiency.

A carrier reproducing device corresponding to the quadrature PSK system can be obtained even in the present embodiment by changing the structures of the phase difference detecting portion 7, the region judging portion 9, and the initial phase generator 11 as in the above-mentioned second embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A carrier reproducing device for reproducing, from an input signal whose carrier is phase-modulated, the carrier, said device comprising:

converting means for converting the input signal into a complex base band signal;

a complex multiplier for complex-multiplying the complex base band signal by a local oscillation signal, to rotate the phase of the complex base band signal;

phase difference detecting means for detecting the phase difference between the input signal and the local oscillation signal upon input of an output signal of said complex multiplier;

local oscillation means for outputting the local oscillation signal whose frequency is controlled depending on the phase difference detected by said phase difference detecting means;

region judging means for judging which of regions previously obtained by division on a complex plane is one to which the complex base band signal belongs;

most frequent region judging means for judging which of the regions on the complex plan is one in which the complex base band signal is concentrated most frequently upon input of an output of said region judging means; and initial phase setting means for setting an initial value of the phase of the local oscillation signal on the basis of an output of said most frequent region judging means.

2. The carrier reproducing device according to claim 1, wherein the input signal is inputted in a burst shape, said device further comprising:

storage means for storing the complex base band signal; and reading means for reading arbitrary parts of data in said storage means in an arbitrary order and supplying the parts to said complex multiplier and said region judging means.

3. The carrier reproducing device according to claim 2, wherein said reading means reads the parts of the base band signal stored in said storage means one over the other.

4. A method of reproducing, from an input signal whose carrier is phase-modulated, the carrier, said method comprising:

a converting the input signal into a complex base band signal;

b) complex-multiplying the complex base band signal by a local oscillation signal, to rotate the phase of the complex base band signal;

c) detecting the phase difference between the input signal and the local oscillation signal upon input of the result of the multiplication obtained in said b) complex-multiplying;

d) controlling the frequency of the local oscillation signal depending on the phase difference detected in said c) detecting;

e) judging which of regions previously obtained by division on a complex plane is one to which the complex base band signal belongs;

f) judging which of the regions on the complex plane is one in which the complex base band signal is concentrated most frequently on the basis of the results of the judgment in said e) judging; and g) setting the initial value of the phase of the local oscillation signal on the basis of the results of the judgment in said f) judging.

5. The method of reproducing a carrier according to claim 4, wherein the input signal is inputted in a burst shape, said method further comprising:

h) storing the complex base band signal obtained in said a) converting, and i) reading arbitrary parts of the complex base band signal stored in said h) storing in an arbitrary order and supplying the parts for processing in said b) complex-multiplying and e) judging.

6. The carrier reproducing device according to claim 5, wherein said i) reading is of reading the parts of the complex base band signal stored in said h) storing one over the other.

* * * * *